United States Patent [19]

Goodman, Jr. et al.

[11] 4,452,233

[45] Jun. 5, 1984

[54] SOLAR ENERGY COLLECTOR

[76] Inventors: Maurice Goodman, Jr., 177 E. 80th St., New York, N.Y. 10021; Mark W. Garrigus, 131 Garrigus Ct., Wolcott, Conn. 06716

[21] Appl. No.: 354,850

[22] Filed: Mar. 4, 1982

[51] Int. Cl.³ .............................................. F24J 3/02
[52] U.S. Cl. ................................ 126/443; 165/142; 165/184
[58] Field of Search ............... 126/443, 450, 442, 432; 165/142, 174, 143, 184

[56] References Cited

U.S. PATENT DOCUMENTS

| | | | |
|---|---|---|---|
| 1,068,650 | 7/1913 | Harrison . | |
| 1,946,184 | 2/1934 | Abbot | 126/271 |
| 2,608,968 | 9/1952 | Moseley | 126/271 |
| 3,227,153 | 1/1966 | Godel et al. | 126/271 |
| 3,952,724 | 4/1976 | Pei | 126/271 |
| 3,954,097 | 5/1976 | Wilson, Jr. | 126/271 |
| 4,033,327 | 7/1977 | Pei | 126/271 |
| 4,043,318 | 8/1977 | Pei | 126/443 |
| 4,092,979 | 6/1978 | Kotlarz | 126/271 |
| 4,122,831 | 10/1978 | Mahdjuri | 126/271 |
| 4,133,298 | 1/1979 | Hayama | 126/271 |
| 4,183,351 | 1/1980 | Hinotani et al. | 126/443 |
| 4,184,895 | 1/1980 | Oster, Jr. | 136/89 |
| 4,186,725 | 2/1980 | Schwartz | 126/443 |
| 4,205,660 | 6/1980 | Kellberg et al. | 126/442 |
| 4,212,293 | 7/1980 | Nugent | 126/450 |
| 4,231,353 | 11/1980 | Kanatani et al. | 126/443 |
| 4,282,857 | 8/1981 | Pei | 126/443 |
| 4,311,131 | 1/1982 | Sabet | 126/443 |

Primary Examiner—Samuel Scott
Assistant Examiner—G. Anderson
Attorney, Agent, or Firm—Nolte and Nolte

[57] ABSTRACT

A solar energy collector of the kind which heats a fluid employs removable energy transfer tubes having an outer glass envelope and an evacuated space between the envelope and an inner metal tube. A manifold is provided to which is connected a number of inner elongate metal tubes having an open end over which are then arranged the energy transfer tubes. The inner metal tubes and the energy transfer tubes form an annular space which is provided with helical fluid flow channels to increase the thermal energy transfer from the radiant solar energy to the fluid. The energy transfer tubes are removable and are not installed on the operable system until the mechanical mounting and fluid connections are made at the operational location.

5 Claims, 5 Drawing Figures

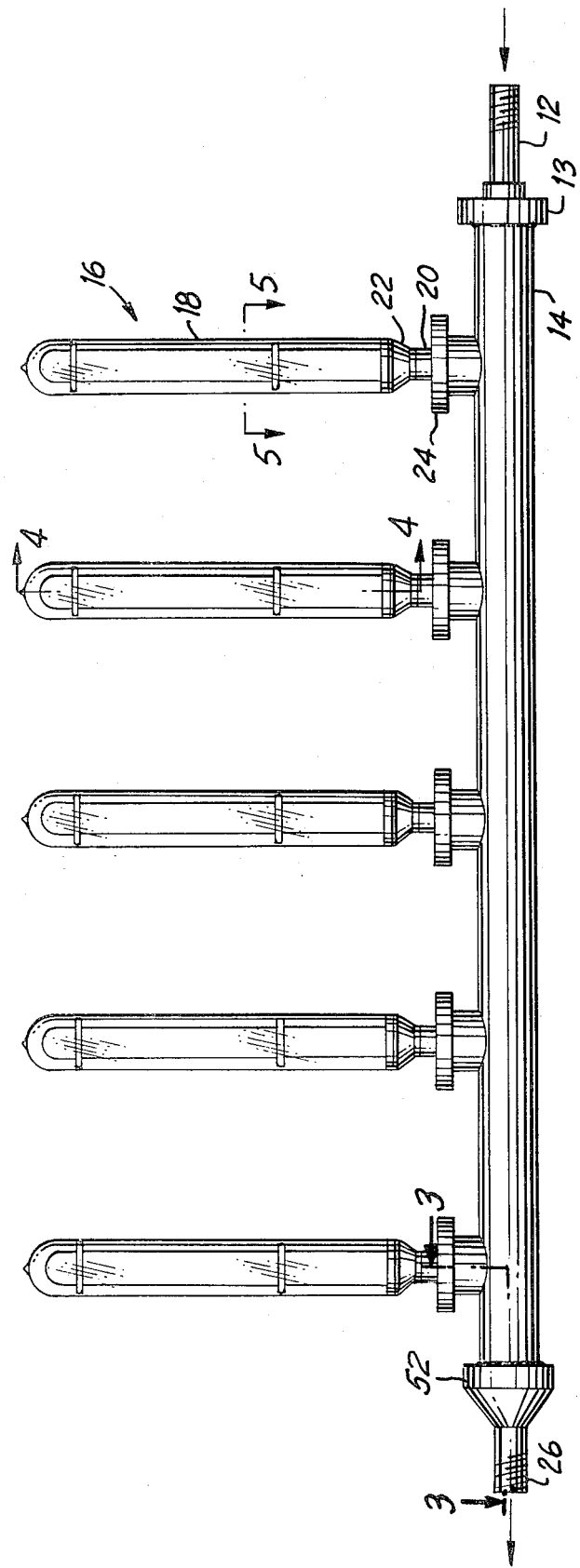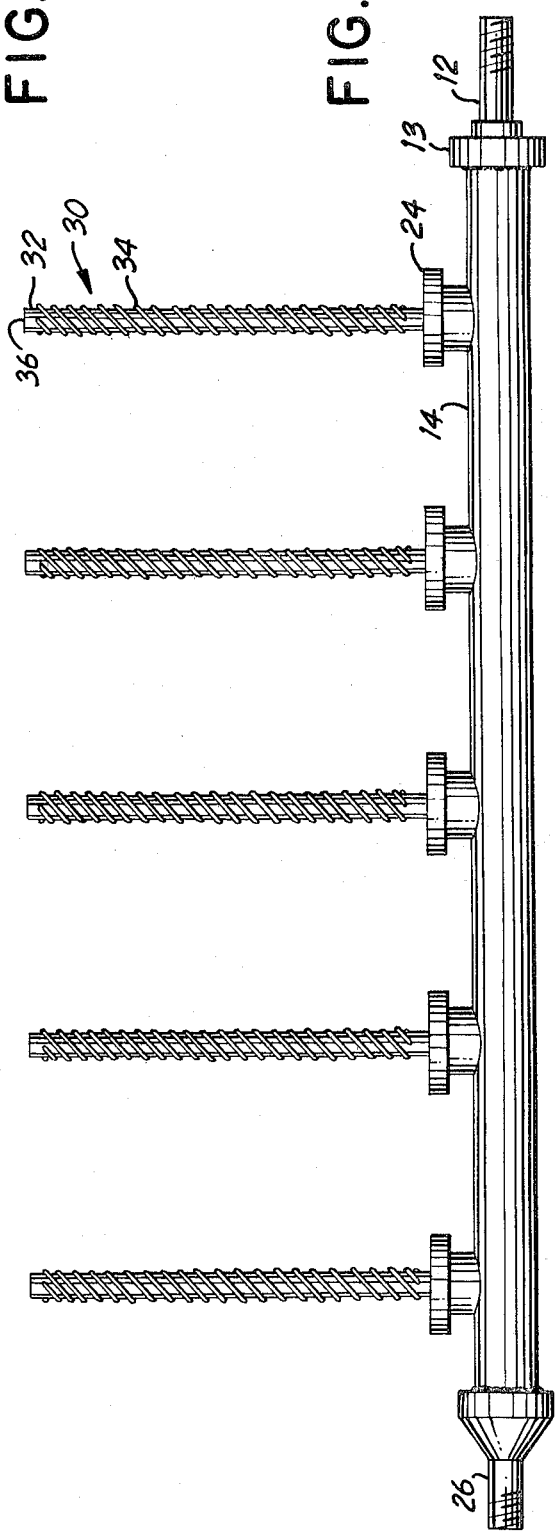

SOLAR ENERGY COLLECTOR

BACKGROUND OF THE INVENTION

The present invention relates to apparatus for converting radiant solar energy to usable heat and, specifically, to apparatus for heating a fluid by using the solar energy incident upon a collector.

There are at present numerous systems available for heating a fluid by solar energy and most employ the basic idea that the fluid is moved through or passed over a portion of the system upon which radiant solar energy is incident. The fluid thereby being heated by the sun. Certain of the systems contain dual concentric glass tubes with a vacuum formed therebetween and with the fluid flowing through the innermost tube. A number of the tubes are then arranged in parallel with the ends interconnected, and a fluid flowing through the tubes is heated by the sunlight falling on the assembly. One major problem with this kind of system is that typically it must be fully assembled at the manufacturing facility and a completely assembled unit ultimately installed, usually on a roof. The size of the fully assembled units makes installation difficult and requires more manpower than is economically desirable. Additionally, many existing solar energy collector systems are formed in such a fashion that if one of the tubes is broken or malfunctions it is necessary to disassemble the entire unit in order to replace one glass tube. Another drawback of many of the known solar energy collectors is that generally they are complicated in that they require a large number of seals and the like in order to make them liquid tight. A problem which is also present in almost all solar collectors of this kind is that a certain amount of laminar flow of the working fluid is present which degrades optimum thermal energy transfer.

SUMMARY OF THE INVENTION

The present invention provides a solar energy collector having vertically arranged energy transfer tubes, through which the fluid being heated flows; such tubes being in fluid communication with a main manifold tube. Each tube connected to the manifold is surrounded by a glass envelope. The energy transfer tube is formed with the glass envelope spaced-apart from an inner metal energy absorber tube, and this space is sealed and evacuated. The glass envelope and the metal tube are assembled to form a unit which is easily installed, and just as easily replaced following installation of the collector system. The metal energy absorber tube and glass envelope assemblies are not installed until the system is arranged, mounted, and connected at its operational location. It has been found that an advantageous installation arrangement in the Northeastern United States has the individual tubes arranged in an upraised fashion at between a 40 to 55 degree angle with respect to the vertical. The tubes are mounted on the manifold with individual spacing such that no shadow is cast by a tube on the adjacent one and, thus, each tube receives the maximum amount of solar energy available.

Inside the metal absorber tube and glass envelope assembly is another inner metal tube provided with outer helical channels formed by wrapping wires or the like around the exterior. The outer diameter of this inner metal tube and the inner diameter of the metal absorber tube are chosen such that the helically arranged wires form helical fluid flow channels between the two metal tubes, thereby effectively eliminating any laminar flow and increasing the thermal transfer capability.

Accordingly, it is an object of the present invention to provide a solar energy collector system including vertically arranged energy transfer tubes having a glass envelope.

It is a further object of the present invention to provide a solar energy collector system employing energy transfer tubes that are not installed until the system is mounted and connected at its operating location.

It is another object of the present invention to provide a solar energy collector system, wherein the fluid flow in the individual tubes is in a helical fashion.

It is another object of the present invention to provide a solar energy collector with energy transfer tubes having inner metal tubes and glass envelopes with the space therebetween being evacuated.

The manner in which these and other objects are accomplished by the present invention will become clear from the following detailed description of the preferred embodiment.

BRIEF DESCRIPTION OF THE DRAWINGS

FIG. 1 is a side elevation of the inventive solar energy collector system;

FIG. 2 is a side elevation of the system of FIG. 1 showing the energy transfer tubes removed;

DETAILED DESCRIPTION OF THE PREFERRED EMBODIMENT

Figure 3:
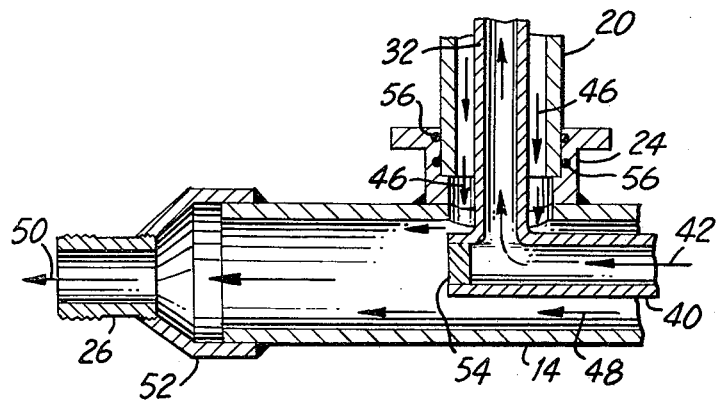
FIG. 3 is a cross-section of the assembly of FIG. 1 taken along section lines 3—3 of FIG. 1 and showing the interior of the tube and manifold assembly.

FIG. 1 is a side elevation of an embodiment of a solar energy collector system constructed according to the teachings of the present invetion. A fluid, such as water or antifreeze, which will be heated by the solar energy, is fed into input tube 12 which is connected through a suitable pipe flange 13 to a larger diameter manifold tube 14. Connected to the manifold tube 14 are a number of individual solar energy transfer units, one of which is shown typically at 16. While only five solar energy transfer units 16 are shown in FIG. 1, the number is not limited to five but is limited only by the fluid pressure drop presented to the incoming fluid at 12 by the successive tubes 16. In high-pressure situations, or when employing booster pumps, the number of tubes 16 connected to a single manifold tube 14 is unlimited. Nevertheless, a forty foot long manifold tube 14 might prove to be unwieldy during installation. Each energy transfer unit 16 includes an outer glass envelope 18 which is sealed to an inner metal absorber tube 20 by a graded metal to glass seal 22. This assembly 16 is connected to the manifold tube 14 by being seated in a mounting flange 24. Each mounting flange 24 is welded or brazed in holes formed in the manifold tube 14.

As will be described in detail hereinafter, the fluid flows into inlet tube 12, passes up the inside of the solar energy transfer units 16, then back down into the manifold 14 and exits from an output tube 26.

In FIG. 2, the inventive collector system is shown with the assembly 16, comprised of the energy absorber tube 20 and outer glass envelope 18 having been removed, thus, revealing the inner elongate metal tubes or fluid conductors, one of which is shown typically at 30. The inner tube 30 comprises a pipe or metal tube 32 having helically formed ridges 34 on its outer surface. These helical ridges 34 will be shown in more detail in FIG. 4. The upper end 36 of each tube 32 has an orifice and the fluid to be heated flows out of this orifice 36. The elements inside the manifold tube 14 and the manner in which the inner metal tubes 30 are connected will be shown in detail below, however, it is noted that the unit shown in FIG. 2 is in the state in which it would normally be shipped minus fluid conductors 30 for installation at the operational location. That is, the energy transfer assemblies 16 plus fluid conductors 30 are not installed until the partial assembly of FIG. 2 is mounted and fluid connections made.

Referring now to FIG. 3, a portion of the inventive solar energy collector system is shown in cross-section so as to reveal the tubes contained inside the manifold tube 14 and also to demonstrate the manner in which the fluid flows through the inventive system. Specifically, the fluid to be heated flows through an interior tube 40, which is connected to the inlet pipe 12 of FIG. 1, in accordance with the arrows shown typically at 42. The inlet pressure forces the fluid to flow up each of the inner tubes 32. Each tube 32 has an orifice at the top and a space is formed between the orifice end 36 of inner tube 32 and the closed end of the inner metal absorber tube 20. Therefore, the fluid flows back down the helically shaped channels between the inside of the absorber tube 20 and the outside of the inner tube 32 and into the manifold tube 14, as shown typically by arrows 46. This fluid flow 46 is mixed with the other fluid, flowing as shown by arrow 48, which has exited the preceding energy transfer units 16. The total of the heated fluid from each of the energy transfer units 16 flows out of the outlet tube 26, as shown by arrow 50. Outlet tube 26 is connected to the manifold tube 14 by a tapered reduction collar 52. The internal tube 40 is provided with an end plug 54 which forces the inlet fluid to flow up each of the inner tubes 32. Welded to the manifold tube 14 are the mounting flanges 24 into which the solar energy transfer assemblies 16 are inserted. Rubber O-rings or other kind of gaskets, shown typically at 56, may be provided to seal the assembly into the seat 24 so that all fluid flows down into the manifold 14 and ultimately out from outlet pipe 22. A positive locking arrangement could be employed to retain the tubes 16 in the seats 24, or alternatively a threaded connection could be employed.

Figure 4:
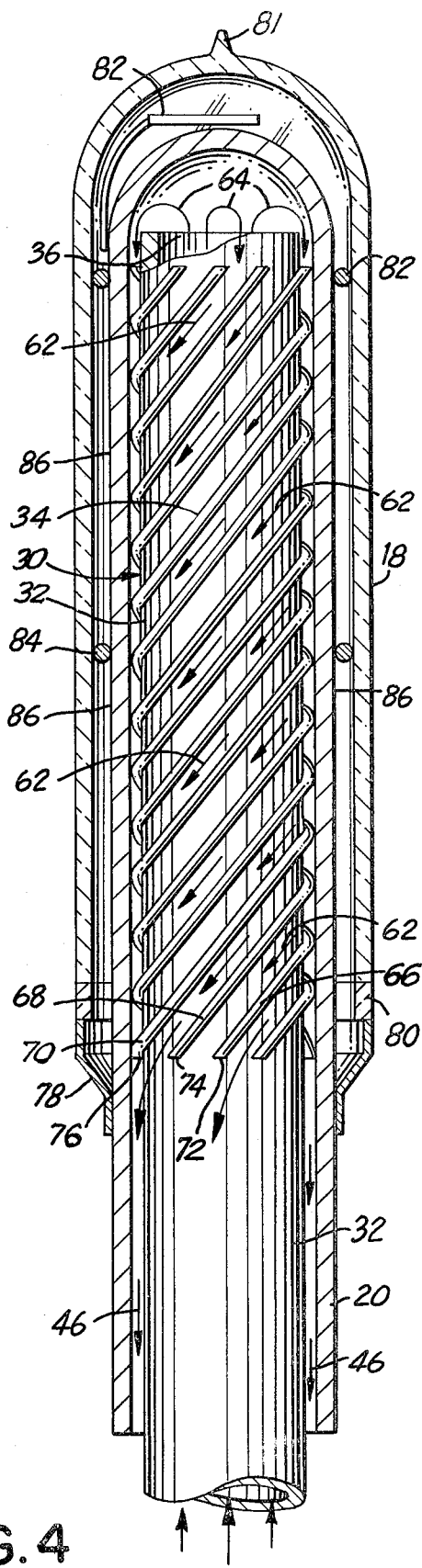
FIG. 4 is a longitudinal cross-section of an individual collector tube assembly taken along section lines 4—4 of FIG. 1.

FIG. 4 shows the solar energy transfer unit 16 of the present invention in longitudinal partial cross-section to reveal the interior thereof. The inner metal tube 30 is not in cross-section to show more clearly the manner in which the helical flow path is provided between the inner tube 30 and the metal absorber tube 20. The helical return passages for the fluid are formed by the wired ridges 34 of FIG. 1 between the metal absorber tube 20 and the inner metal tube 32. This fluid flow is represented by arrows 62. Once the fluid exits the orifice end 36 of the inner metal tube 32, as represented by arrows 64, gravity causes it to flow downwardly through the helical channels formed between the inner tube 30 and the absorber tube 20. This helical flow increases the opportunity for energy transfer, and eliminates any possibility for laminar flow to exist. The fluid is in direct contact with both metal tubes 20 and 32 for a length of time longer than if the helical channels were absent, i.e., the helical channels act to increase the surface area of the tube.

While a number of various techniques exist for forming the helical channels, in the present embodiment the helical passages are formed by affixing a plurality of wires around the circumference of the inner tube 32. One end of each of the wires is first tack welded to the tube 30, and then the tube is turned 360 degrees while the wires are arranged over a specific length of the tube length, thereby providing helical rims or flanges on the exterior of the inner metal tube 32. Upon turning the inner metal tube 32 a sufficient number of turns so that the wires 34 reach the other end of the tube 32, the other end of the wires are then tack welded in the same manner as the first ends. Three such wires being shown at 66, 68, and 70 and being tack welded at their lower ends at 72, 74, and 76, respectively. The inner diameter of the absorber tube 20 and the outer diameter of the inner metal tube 32 are chosen so that the difference between the diameters is equal to two diameters of the helical wires 66, 68, and 70. Alternatively, the helical channels could be extruded by broaching grooves into the inside diameter of the walls of the absorber tube 20.

The outer glass envelope 18 is sealingly attached to the metal absorber tube 20 by means of a ring-shaped seal 78 formed of Kovar. As is known, Kovar is an iron-nickel-cobalt alloy that has thermal expansion properties which approximate those of glass and which is used in making metal to glass seals. The Kovar metal seal 78 is welded to the absorber tube and to a graded glass seal 80 which has properties of thermal expansion which are also similar to kovar. Graded glass seals are known and are typically made of various kinds of glass arranged in layers so that a desired rate of thermal expansion is obtained. The glass envelope is held in spaced-apart relationship with respect to the absorber tube 20 by means of vacuum spacer rings 82 and 84. The spacer rings 82, 84 can be formed with grooves or channels to permit blow-by and to prevent forming distinct, isolated volumes in the space to be evacuated.

Once the proximal end of the glass envelope 18 is sealed to the metal absorber tube 20 by means of the Kovar metal seal 78 and graded glass seal 80, a relatively hard vacuum, less than 10-4 torr, is formed in the volume between the glass envelope 18 and the absorber tube 20. This is accomplished by pulling a vacuum in a conventional fashion at an evacuation tip 80 formed in the end of the glass envelope 18; the tip is then sealed off. Any remaining air or impurities in the newly evacuated space are eliminated by an inductively fired getter 82. It is preferable to employ a getter which can be fired at temperatures as low as 600° F., thereby eliminating any possibility of damage to the unit caused by high temperatures used in firing the getter.

The energy transfer tube assembly 16 should have a high absorbance factor for light of greater than 0.85. Thus, the inner metal absorber tube 20 may have its outer surface 86 coated with black chromium oxide, black nickel oxide, or thermal absorbency paint. These black tubes should also have a low emission factor.

Figure 5:
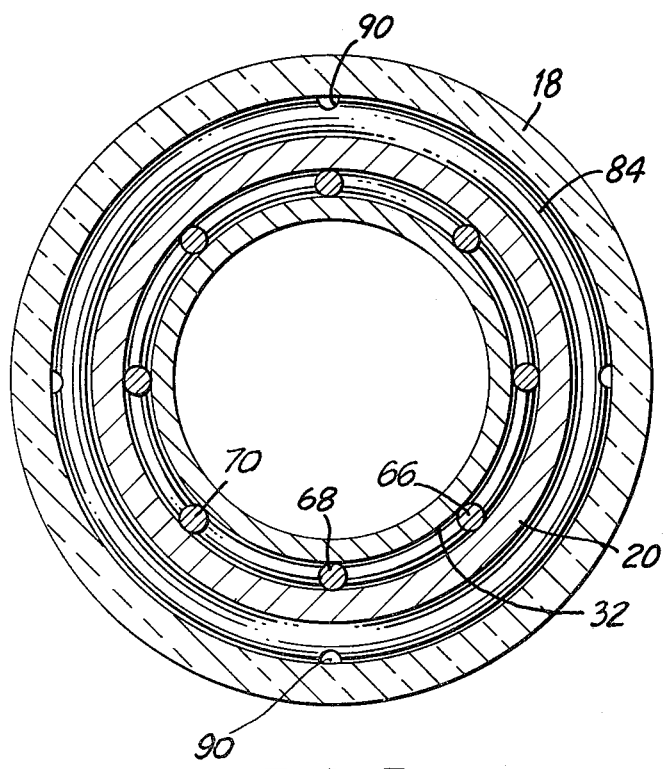
FIG. 5 is a transverse cross-section of a collector tube taken along section lines 5—5 of FIG. 1.

FIG. 5 is a transverse cross-section of an inventive energy transfer unit 16 and shows the concentric arrangement of the elements making up the unit. The glass envelope 18 surrounds the entire assembly forming an annular space, with the metal absorber tube 20 and the inner metal tube 32 being maintained in spaced-apart relationship by means of the wires 66, 68, 70 which serve to form the helical flow passages arranged in another annular space. Also seen in FIG. 5 is the vacuum spacer ring 84 of FIG. 4 and since the cross section of FIG. 5 is taken slightly above this vacuum spacer 84 it is not shown in cross-section, thereby showing the grooves 90 cut in the vacuum spacer ring 84 to permit communication between the annular chambers formed by such spacer rings.

Referring back to FIG. 1, now that the interior arrangement of the elements of the inventive system have been shown, it is noted that the inventive system is intended to be mounted on the roof of a building, with the energy transfer tubes pointing substantially vertically. A tilt could be provided depending upon the geographic location of the installation, for example, a tilt of between 40 to 55 degrees would be preferrable for installations in the Northeast United States. The system is intended to employ approximartely ten tubes for every 32 inches of manifold tube, with the only limitation being essentially that additional tubes would cause too great a fluid pressure drop and booster pumps or the like would be required.

In a typical installation, all of the elements making up the inventive assembly are completely prefabricated at a main assembly facility, however, the metal tube and glass envelope energy transfer tubes are packaged separately. The manifold and the vertical tube assembly are arranged at the installation location, with the tilt being provided as determined by the geographical location. All fluid connections are made. As the very last step, the energy absorber tubes with the glass envelopes are slid over the metal inner tubes and brought into sealing relationship with the mounting flange 20 either by screw thread or by O-ring seals. At that point, the inventive system becomes operable. In the event that a glass envelope is damaged, then the system need be shut down only for a few moments, while a new absorber tube and glass envelope assembly is installed, and the system then becomes operable once again. Thus, a typical installation would have a sufficient supply of spare absorber tube-glass envelope assemblies to maintain essentially continuous operation of the inventive solar energy collector system.

It is understood that the foregoing is presented by way of example only and is not intended to limit the scope of the invention, except as set forth in the appended claims.

What is claimed is:

1. A solar energy collector assembly of the kind having a fluid flowing therethrough, said system comprising:
   a manifold elongated along a horizontal axis and having a fluid inlet conduit extending parallel with the axis of and within said manifold, said manifold having a plurality of apertures longitudinally spaced one from the other along the upper length of said manifold with axes of said apertures substantially normal to the axis of said manifold, said manifold having a fluid outlet conduit surrounding said inlet conduit, communicating with said apertures and extending substantially the length of said manifold to a fluid outlet;
   a plurality of elongate metal, tubular fluid conductors extending substantially coaxially with the axes of said apertures and being connected at their lower ends to and communicating with said inlet conduit and extending upwardly through said fluid outlet conduit and above said apertures a predetermined distance to their distal ends, said distal ends being open;
   a plurality of metal energy transfer tubes having open ends and closed ends and dimensioned to be and concentrically disposed over said metal tubular fluid conductors forming with said metal tubular fluid conductors concentric spaces therebetween, means removably connecting said open ends of said energy transfer tubes directly to the upper length of said manifold adjacent said apertures to constitute said spaces between said energy transfer tubes and said fluid conductors as conduit means for conducting fluid form said open ends of said metal tubular fluid conductors to said fluid outlet conduit of said manifold;
   a plurality of outer glass envelopes with closed distal ends concentrically disposed over said metal energy transfer tubes and extending downwardly to their proximate ends at a substantially horizontal plane above said means connecting said energy transfer tubes to said manifold and forming with said transfer tubes annular spaces therebetween;
   means between said metal energy transfer tubes and the proximate ends of said glass envelopes for forming vacuum tight seals, said spaces between said glass envelopes and said energy transfer tubes being evacuated;
   means for maintaining the spaces between said glass envelopes and said metal energy transfer tubes; and
   a plurality of helices extending around each said metal tubular fluid conductors and between and in contact with the opposing concentric walls of said fluid conductors and said energy transfer tubes and forming a plurality of helical channels constituting fluid communication means between the distal ends of each of said fluid conductors and said fluid outlet conduit.

2. The solar energy collector assembly of claim 1, wherein said helices comprise a plurality of metal wires welded at their ends to the surfaces of said metal tubular fluid conductors.

3. The solar energy collector assembly of claim 1, wherein said means for forming vacuum tight seals comprises metal rings formed of Kovar and ring-shaped graded-glass seals, said metal rings being welded to said metal energy transfer tubes, said graded-glass seals being fused to said glass envelopes and said rings.

4. The solar energy collector assembly of claim 1, further comprising inductively fired getter means in said spaces between said glass envelopes and said energy transfer tubes.

5. The solar energy collector assembly of claim 1, wherein said means for maintaining the spaces between said glass envelopes and said metal energy transfer tubes comprise resilient ring members arranged concentrically with said metal energy transfer tubes and including means for fluid communication between the spaces above and below said ring members.

* * * * *